Sept. 5, 1967 W. A. WOLF 3,339,659
POWERED FRICTION-DRIVING DEVICE FOR VEHICLES
Filed Nov. 22, 1965 4 Sheets-Sheet 1
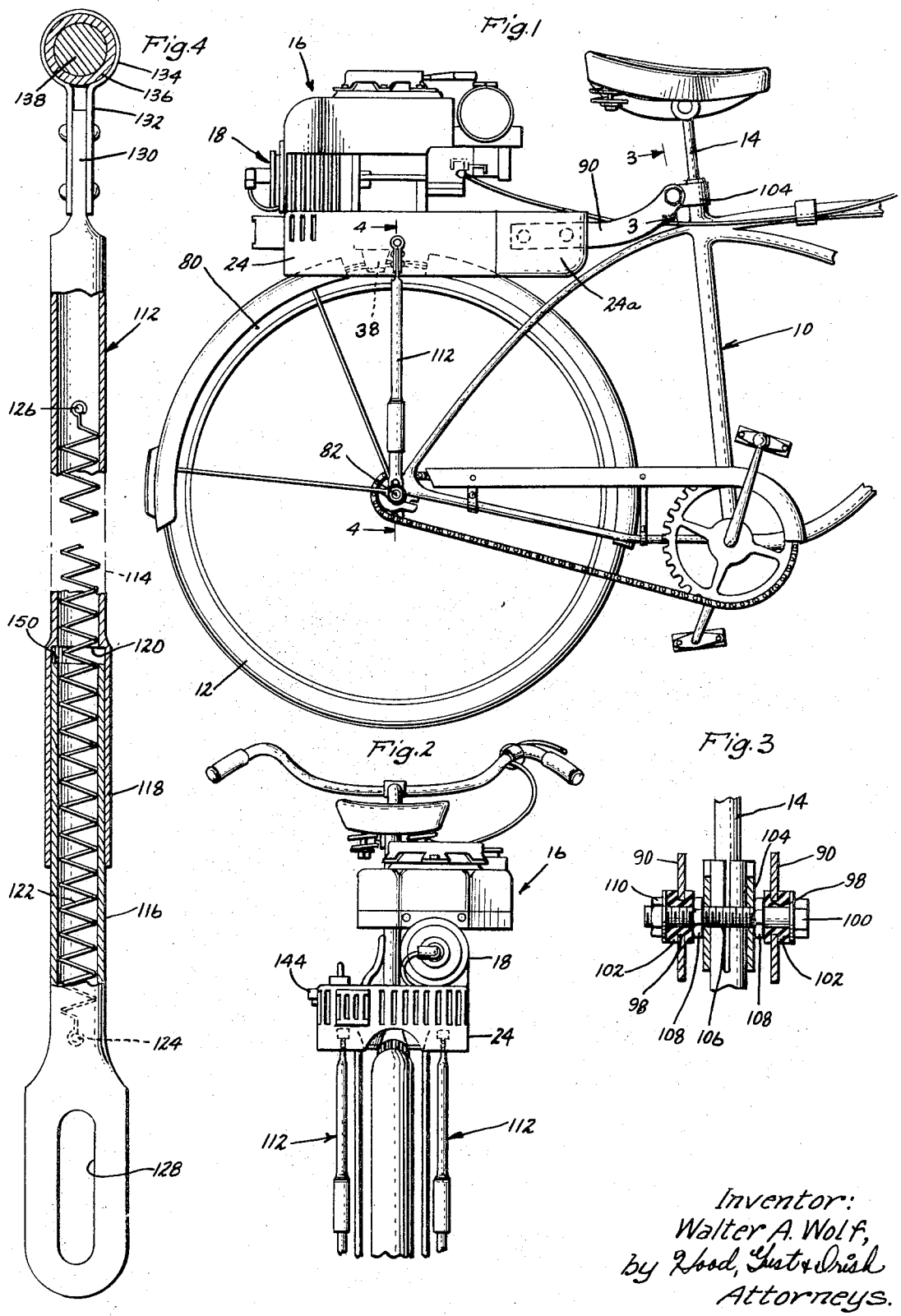
Inventor:
Walter A. Wolf,
by Wood, Hurst & Drish
Attorneys.

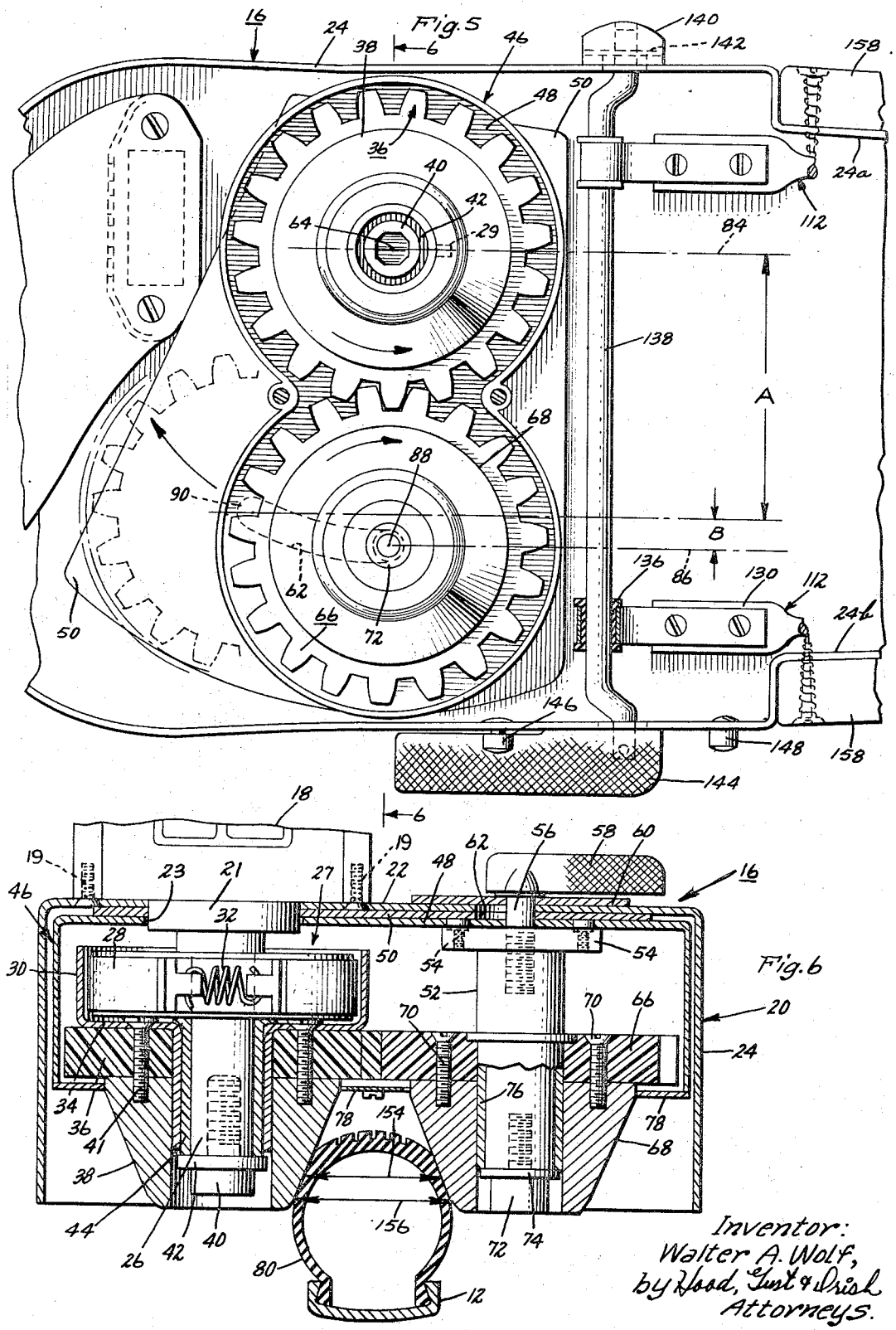

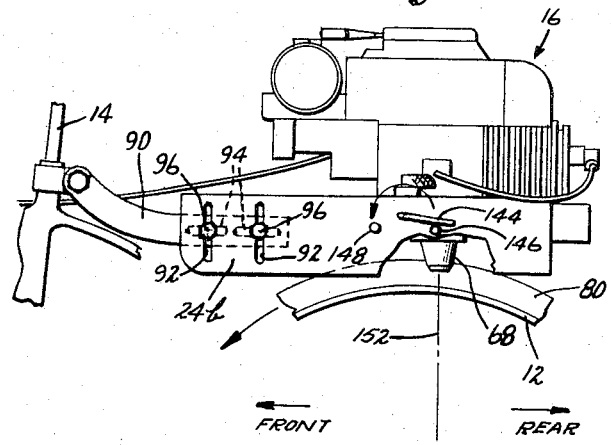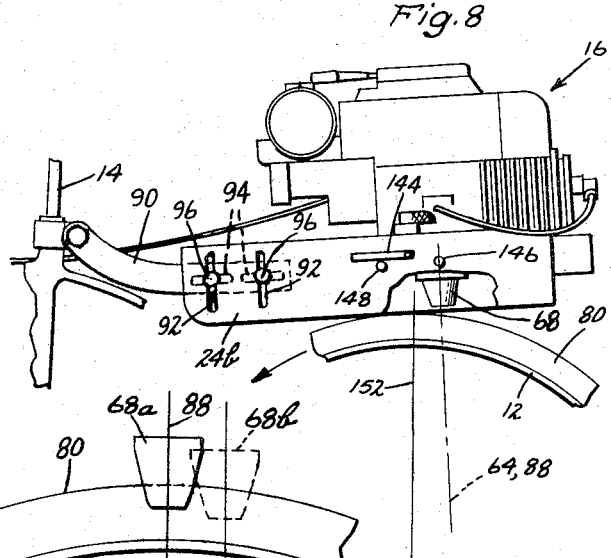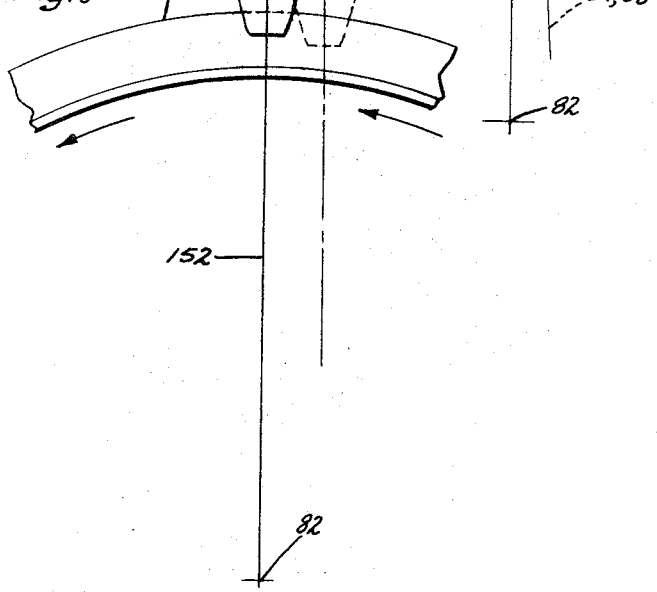

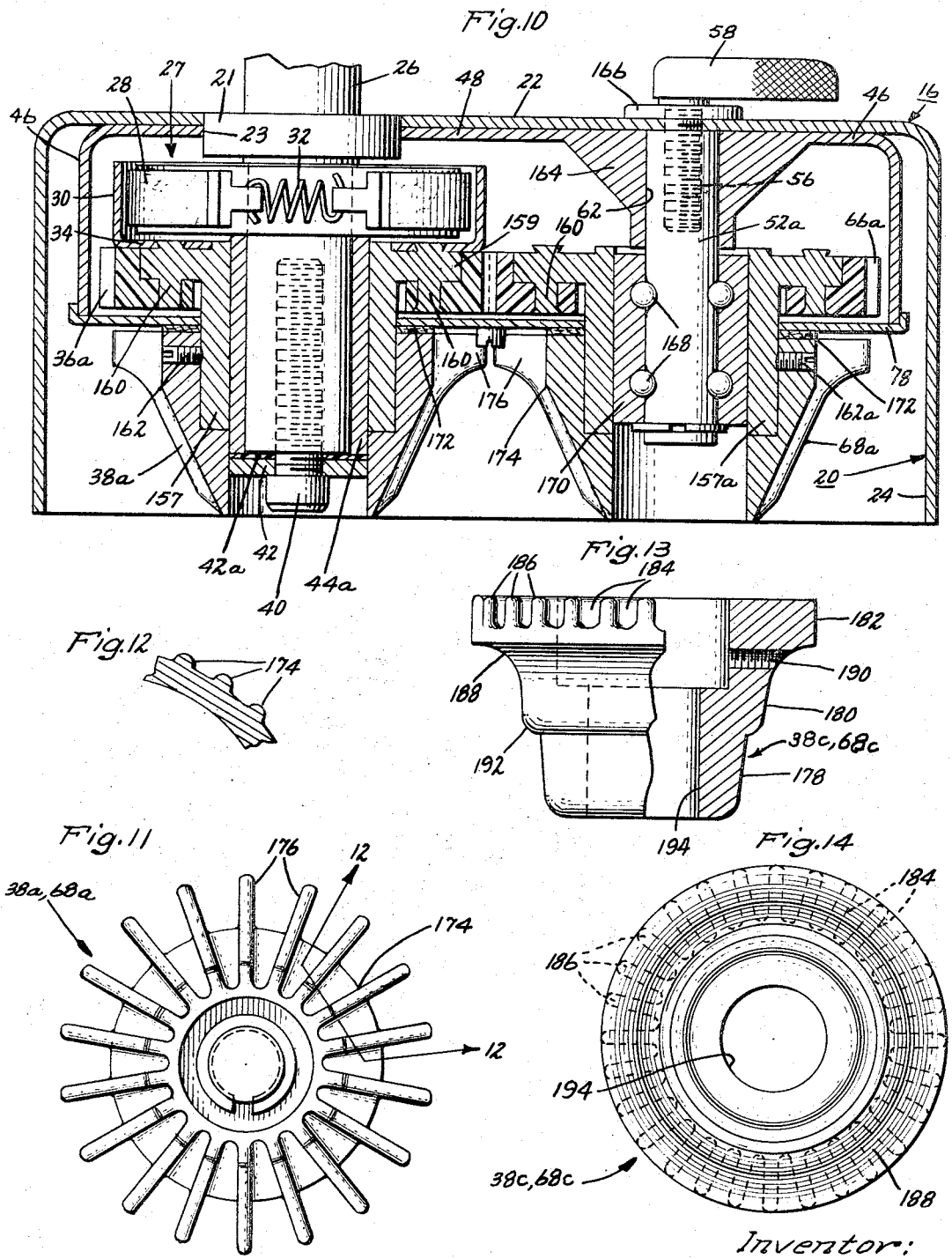

United States Patent Office 3,339,659
Patented Sept. 5, 1967

3,339,659
POWERED FRICTION-DRIVING DEVICE
FOR VEHICLES
Walter A. Wolf, 317 N. Hillcrest Drive,
Logansport, Ind. 46947
Filed Nov. 22, 1965, Ser. No. 509,014
20 Claims. (Cl. 180—33)

The present invention relates to powered friction-driving devices for vehicles, and more particularly to a motor drive for a conventional, pedal-operated bicycle.

Many motor devices have been devised previously for attachment to a conventional bicycle. In the usual instance, the drive is obtained by a motor-driven friction pulley which engages the outer periphery of the tire. Considerable difficulty has been encountered in this type of drive in the respect of maintaining a uniform and efficient driving engagement and obtaining different drive ratios. In many of these devices, the weight of the motor has been relied upon to maintain the friction pulley in proper contact with the tire. In other devices, springs have been used for urging the pulley into engagement. Unevenness in the road and road shock which causes the rear wheel to bounce up and down affects the driving engagement. Also, in wet weather reduced friction results in a lack of drive between the pulley and the tire periphery. There are many other disadvantages in this type of drive as well as other drives well known to persons skilled in the art.

It is, therefore, an object of this invention to provide a powered friction-driving device capable of overcoming many of the deficiencies of prior art devices as mentioned hereinabove.

It is another object of this invention to provide a powered friction-driving device wherein driving members are engaged with side portions of the tire instead of the periphery thereof.

It is still another object of this invention to provide a friction drive for tire-equipped wheels wherein oppositely rotatable, frusto-conically shaped members are engageable with opposite side portions of a tire in such a manner as to impart rotation to the wheel. As an extension of this object, speed-shifting means are provided for altering the point or line of engagement of the drive members with the tire such that the speed of the wheel may be changed for a given speed of rotation of the drive members. Also in a device of this nature it is an object to provide for adjustability to drive a variety of tire widths maintaining the same point of engagement on the driving members.

Another object is to provide a power device that may be mounted on a standard bicycle in a facile manner by using the standard seat post clamp as the hinge point for the power device. As a corollary, it is an object to provide means for selectively swinging the power device about this hinge point whereby the bicycle may be pedal operated without interference from the power device or may be so operated in conjunction therewith.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation of the rear portion of a conventional bicycle and one embodiment of the driving apparatus of this invention mounted thereon;

FIG. 2 is a fragmentary rear view of the arrangement of FIG. 1;

FIG. 3 is a fragmentary sectional view taken substantially along section line 3—3 of FIG. 1;

FIG. 4 is a side view of one of the braces shown in FIGS. 1 and 2 and is partially sectioned longitudinally for clarity of illustration;

FIG. 5 is a fragmentary view of the drive device of FIG. 1 taken from the underside thereof with certain parts being sectioned for clarity of illustration and other parts being removed;

FIG. 6 is a cross-section taken substantially along section line 6—6 of FIG. 5;

FIGS. 7 and 8 are fragmentary side views, partially broken away for clarity of illustration, showing engagement and disengagement, respectively, of the driving cones with the tire of the rear wheel;

FIG. 9 is a diagrammatic illustration used for the purpose of explaining the operating principles of this invention;

FIG. 10 is a cross-section like FIG. 6 but of a second embodiment of this invention;

FIG. 11 is an end view of one cone used in the embodiment of FIG. 10;

FIG. 12 is a fragmentary cross-section of the cone and is taken substantially along section line 12—12 of FIG. 11;

FIG. 13 is a partial axial section of still another embodiment of a driving cone; and FIG. 14 is an end view thereof.

Referring to the drawings, and more particularly to FIGS. 1 and 2, a conventional, pedal-operated bicycle having a tubular frame 10 is provided with a tire-equipped rear wheel 12 and the usual seat post 14. Mounted on the bicycle in driving relation with the wheel 12 is a powered friction device (also hereinafter identified as a "power unit"), indicated generally by the reference numeral 16. This power unit 16 is mounted on the rear portion of the bicycle immediately above the rear wheel as shown. The mounting and the unit itself are described in the following.

Referring additionally to FIGS. 5 and 6, the power unit 16 comprises a gasoline engine 18 which preferably is of the two-cycle variety. This motor 18 is mounted on and supported by a sheet metal frame or chassis 20 (also referred to as a "carrier" in certain instances) having a flat top 22 and depending flange 24 which surrounds and substantially encloses all of the operating mechanism. The motor 18 is attached to the flat top 22 by any suitable means, such as fastening screws 19. Depending from the motor 18 housing is the usual annular locating boss 21 which rotatably fits into a bearing aperture 23 in the top plate 48 of a gear housing 46 to be described more fully hereinafter.

The motor shaft 26 of motor 1 depends vertically through a companion opening in the chassis top 22 as shown and has mounted thereon a conventional centrifugal clutch indicated generally by the reference numeral 27. This clutch contains the usual shoe assembly 28, a drum 30 and a balancing spring 32 which holds the shoes 28 from engagement with the drum until the motor shaft 26 rotates at a predetermined speed. Once this speed has been reached, the shoes 28 are thrown outwardly by centrifugal force as they are rotating with the motor shaft 26 and engage the drum 30, causing it to rotate. As stated hereinabove, this centrifugal clutch is of conventional design and needs no further elaboration. Secured to the end or disc-portion 34 of the drum 30 is a spur gear 36, the axis of this gear 36 coinciding with the axis of the shaft 26. Thus, the gear 36 can rotate in unison with the drum 30.

Secured coaxially to the underside of spur gear 36 is a frusto-conically shaped drive member or cone indicated by the numeral 38. Screws 41 serve in fastening drum end 34, gear 36 and cone 38 into a secure and rigid assembly. Drive member 38, even though it is frusto-conical in shape, is referred to hereinafter in a number of instances as a "cone" or "driving cone," for purposes of convenience.

Shoe assembly 28 is conventionally secured to shaft 26 of the motor for rotation therewith by means of the usual key and slot assembly 29 (FIG. 5). A screw 40 coaxially threaded into the end of shaft 26 bears against a washer 42 which in turn bears against the end of shaft 26 and also the end of clutch sleeve bearing 44. This bearing 44 is suitably coaxially secured to drum end 34 and is rotatable with respect to motor shaft 26. Engagement of the lower end of this tubular bearing 44 with washer 42 provides vertical support for the drum 30 and the other parts of the clutch assembly.

Gear 36 as well as other parts to be described later as well as the centrifugal clutch 27 are enclosed preferably in a housing generally indicated by numeral 46. As shown in FIG. 6, housing 46 is fabricated of sheet metal with a flat top 48 operatively engaged with the top 22 of chassis 20 with a plate 50 therebetween. Mounted on the top 48 is a spindle 52 which extends parallel to the vertical engine shaft 26. This spindle 52 is secured to the top 48 by means of suitable screws 54 recessed into the top 48 sufficiently to permit movement of the latter about the engine boss 21 with respect to the intermediate plate 50.

As shown more clearly in FIGS. 5 and 6, a stud 56 is threaded coaxially into the upper end of spindle 52 and carries a head 58 in the form of a lever on the upper end thereof. Interposed between the head or lever 58 and the top 22 of chassis 20 is a suitable clamping washer 60 whereby tightening of the stud 56 will result in the head or lever 58 securely clamping the upper end of spindle 52 and the three parts 48, 50 and 22 together.

In both the chassis top 22 and the intermediate plate 50 is formed an arcuate slot 62 having a radius of curvature centered about the axis 64 of motor shaft 26. The length of this radius is indicated by the latter dimensions (A+B) in FIG. 5. Thus, by turning the lever 58 so as to loosen stud 56 in spindle 52, the stud as well as the spindle 52 can be swung through the slot 62 to a desired position and there tightened in place.

Rotatably mounted on the spindle 52 is a spur gear 66 which is identical in size and shape to the spur gear 36 for one embodiment of this invention. This gear 66 is meshed with the gear 36, and since the axes of the spindle 52 and shaft 26 are parallel, so will the axes of these two gears be parallel. Coaxially secured to the underside of the gear 66 is another frusto-conically shaped drive member or cone 68 of the same size and shape as cone 38, suitable screws 70 passing through the gear 66 serving this purpose. In other forms of the invention, the gears 36 and 66 may be of different diameter; however, the cones should always be of different diameter in a compensating direction to maintain the peripheral velocities thereof the same.

A retaining screw 72 threaded into the lower end of the spindle 52 bears against a washer 74 which in turn bears against the lower end of the tubular bearing 76 which surrounds the spindle 52. This bearing 76 is interposed between the gear 66 and cone 68, permitting the latter to rotate with respect to the spindle 52.

A bottom plate 78 (present in FIG. 6 but removed in FIG. 5) is secured to the bottom portion of the housing 46 for closing the latter, this plate 78 having circular cutouts or openings for receiving with slight clearance the cones 38 and 68 therethrough.

As shown more clearly in FIG. 6, the two cones 38 and 68 are spaced apart a distance corresponding to the width of a bicycle tire 80. The cones 38 and 68 as well as the tire 80 are shown substantially to scale in FIG. 6, as are the other parts therein.

Further understanding of the positional relationships between the cones and the tire 80 may be understood by considering that the axes of the two cones lie in parallel planes which intersect the wheel axis 82 at right angles. The dashed lines in FIG. 5 indicated by the numerals 84 and 86 are representative of the planes including the axes 64 and 88 of the two cones 38 and 68, respectively. Viewing FIG. 5, it will immediately become evident that if the stud 56 is swung in the slot 62 to the end 90 of the slot, the two planes 84 and 86 will be moved closer together a distance corresponding to the dimension B thereby causing the two cones 38 and 68 to move closer together with respect to the tire 80. This will be explained in more detail later on.

Thus far described, it will be apparent that with the motor 18 operating at slow speed, the shaft 26 will not rotate fast enough to cause the centrifugal clutch 27 to become engaged. However, upon increasing the speed of the motor 18, the centrifugal clutch will become engaged and cause rotation of the drum 30 in unison with the shaft 26. This will result in imparting rotation to the gear 36 and cone 38, and since the gear 36 is meshed with the gear 66, this will cause rotation of the latter as well as the cone 68. With the two cones 38 and 68 frictionally engaged with the opposite side portions of the tire 80 as shown more clearly in FIG. 6, rotation of the wheel 12 will occur. This will be explained in more detail later on.

The mechanism for supporting the power unit on the bicycle will now be described. Two sheet metal straps (FIGS. 1, 3, 7 and 8), indicated by the numeral 90, spaced apart, are secured to the front end portions 24a and 24b of the flange 24 of the chassis 20. Each of the sides 24a, 24b is provided with two spaced vertical slots 92. One end portion of the two straps 90 is provided with a longitudinally extending slot 94. Suitable fastening screws and nut assemblies 96 passing through the slots 92 and 94, respectively, serve to clamp securely the straps 90 to the respective sides 24a and 24b.

The front or forward ends of the straps 90, as shown more clearly in FIG. 3, are provided with apertures 98 which receive a pivot bolt 100 therethrough with clearance. Interposed between the bolt 100 and the holes 98 are rubber grommets or bushings 102, these bushings providing a cushion mount between the bolt 100 and the straps 90.

A conventional U-shaped seat post clamp 104 surrounds the frame socket into which the seat post 14 is inserted. The pair of apertures 106 in clamp 104 receives with only a sliding clearance an elongated bolt 100, the shorter bolt used to secure the seat post in place having first been removed. Two nuts 108 threaded onto the bolt 100 serve to compress the flange portions of the clamp 104 together for securing the seat post 14 in place.

A nut 110 threaded onto the end of the bolt 100 serves to secure the entire assembly together.

By reason of the pivot pin connection provided by the bolt 110 and the mounting provided by the slots 92 and 94, it is readily apparent that the power unit 16 may be adjusted to any desired operating position, within reason, forward and aft as well as vertically with respect to the bicycle frame. The preferred adjustment will be described later on.

Lateral braces for limiting the downward movement of the power unit 16 are shown in FIGS. 1, 2 and 4. These braces are indicated by the numeral 112. Two such braces are used, one on each side of the wheel 12.

As shown in FIG. 4, each brace 112 is composed of two tubular members 114 and 116 which are partially telescoped together. The upper member 114 is provided with an enlarged portion 118 which slidably receives the upper end portion of the member 116. A shoulder 120 at the base of the enlarged portion 118 limits the telescoping movement of the two parts 114 and 116.

A tension spring 122 is connected at opposite ends to anchor pins 124 and 126 secured to the two tubular members 116 and 114, respectively. This spring 122 constantly urges the two members 114 and 116 together.

The lower end of the member 116 is provided with a slot 128 adapted to fit over the axle of the wheel 12. The upper end of the tubular member 114 is flattened as shown at 130, and this flattened portion is clamped between the flanges of a carrier clip 132. The cylindrical portion 134 of this carrier clip carries a rubber bushing 136 for a purpose to be explained in the following.

While the strut 112 has been disclosed as being in two telescoping pieces, it is contemplated that the strut may be made from a single, flexible, non-telescoping piece without departing from the spirit and scope of this invention.

Attention is now directed to FIG. 5. Extending between opposite lateral portions of flange 24 is an eccentric shaft 138 having the opposite ends thereof journaled in the sides 24a and 24b. A bearing cap 140 fits over one end of shaft 138 and a pin 142 through both cap 140 and shaft 138 fastens the parts together. The opposite end of the shaft is affixed to one end of a lever 144, this lever 144 being swingable through an angle slightly greater than 180° for locking purposes against two studs or stops 146 and 148 secured to the side 24b of the chassis. FIGS. 7 and 8 illustrate the lever 144 swung to its opposite extreme positions against the two stops 146 and 148, respectively. In both of these positions, the eccentric is slightly beyond top and bottom dead-centers, respectively, thereby locking the motor unit in the selected position.

Now considering FIGS. 1, 4 and 5 together, the rubber bushing 136 in the upper end of brace 112 is mounted on the eccentric shaft 138 next to one side 24a, 24b of the chassis. The two braces 112 are mounted adjacent to opposite sides of the chassis, as more clearly shown in FIG. 5. Shaft 138 as well as braces 112 are made sufficiently strong to support the power unit 16 lifted out of engagement with tire 80 or, in the alternative, to hold the cones into engagement with the tire with a predetermined force. This will be explained in more detail later on.

The eccentricity of the shaft 138, the position of lever 144 on the shaft and the location of the two stops 146 and 148 are arranged such that when lever 144 is thrown to the position in engagement with stop 148, the power unit 16 will be lifted to the position shown in FIG. 8 with cones 38, 68 out of contact with the tire 80. Conversely, when lever 144 is thrown to the position 146 shown in FIG. 7, the eccentric portion of shaft 138 is moved to a position at which cones 38 and 68 will be fully engaged with tire 80 as shown in FIG. 6 and a given force will be exerted on tire 80.

With the lever 144 in this latter position, let it be assumed that the cone centers are spaced apart a distance corresponding to dimension (A+B). Also let it be assumed that struts 112 will be closed with the ends 150 abutting shoulders 120. Further let it be assumed that these conditions result in the cones engaging the tire with a predetermined driving force. Now assume that a change in the driving ratio is desired. This is accomplished by, in this example, adjusting cone 68 inwardly to shorten dimension B. This moves the cones closer together, which results in a wedging action of the cones on the tire, this action tending to lift the power unit and to extend the struts 112. When this wedging force becomes sufficient to overcome the tension of the springs 122, the latter will stretch and the strut pieces will separate. Under this condition, the total force exerted on the tire will be that attributable to the weight of the power unit plus the forces exerted by the springs 122. It will now be apparent that this force is limited by the spring forces which are substantially constant within the adjustment range afforded by the dimensions A and B.

As will now be apparent, whether the cones 36, 68 are or are not engaged with the tire 80, the manual, pedal operation of the bicycle can still be performed.

As shown in FIGS. 1, 7, 8 and 9, the power unit 16 preferably is so adjusted on the bicycle as to position the axis 64 of cone 38 on a vertical line 152 which is perpendicular to the axis 82 of the rear wheel 12. Further, the adjustment is such that the cone 68 may be swung to position axis 88 both forwardly and rearwardly of line 152.

With spindle 52 positioned as shown in FIGS. 5 and 6, cones 38 and 68 will be spaced a maximum distance apart. If cone 68 is swung to its innermost position as determined by the end 90 of slot 62, the separation between the two cones 38 and 60 within which tire 80 may run is diminished. This condition is illustrated diagrammatically in FIG. 9, wherein the position 68a for cone 68 indicates that shown in FIGS. 5 and 6, while position 68b is that for the cone when spindle 52 is moved to end 90 of slot 62. Adjustment of the spindle 52 through slot 62 will not disturb the meshed relationship of the two gears 36 and 66 and furthermore provides for a different speed ratio of engagement, as explained in part hereinbefore, of the two cones 38 and 68 with tire 80. This is explained as follows.

With cone 68 in the position shown in FIGS. 5 and 6, the average point or line of engagement between tire sides 80 and the two cones 38 and 68 occurs on the tire at about the regions indicated by the double-ended arrow 154 in FIG. 6. By swinging cone 68 inwardly as far as end 90 of slot 62 will allow, this will result in new points or lines of engagement of the two cones 38 and 68 with the tire 80 sides. These points of engagement on the cones will generally correspond to the points on the double-ended arrow 156 in FIG. 6. Under these latter conditions, since cones 38 and 68 are moved more closely together, this will cause the latter to ride somewhat higher on the tapered tire sides and thereby provide a smaller diameter portion of the cones to be engaged with the tire sides. This latter condition for a given engine speed will result in slower rotation of wheel 12.

The adjustment permitted by slot 62 not only permits speed adjustment, but also assists in adapting the power unit 16 to tires of different sizes. Thus, for any given, standard size of bicycle tire, cone 68 may be adjusted through the intermediary of slot 62 to a position at which the most efficient engagement with the tire sides may be achieved.

In operation, and assuming it is desired to start the bicycle in motion from a standing position, the first step is to start the motor 18. While idling, the clutch 27 will not be engaged. When it is desired to start bicycle movement, the speed of motor 18 is increased, thereby causing the centrifugal clutch 27 to engage. This results in rotation being imparted to gear 36 and also gear 66. The two cones 38 and 68 are caused to correspondingly rotate, and since these are in frictional engagement with the rear tire 80, the bicycle will be caused to move forwardly. The speed of the bicycle may be controlled by adjusting the speed of motor 18.

When it is desired to stop, the speed of motor 18 is reduced to and below that at which clutch 27 becomes disengaged. Drive to the rear wheel is thereby cut off.

A preferred operating embodiment of this invention, designed for mass-production, is illustrated in FIGS. 10, 11 and 12. This operating embodiment is constructed substantially the same as that just described in connection with FIGS. 1–9 such that it will not be necessary to describe in detail all of the parts thereof. Like numerals indicate like parts, and where the parts are essentially identical but perhaps differ slightly in shape or form, the same reference numeral is used with the suffix a added.

Referring now to FIGS. 10, 11 and 12, instead of using screws, such as screws 41 shown in FIG. 6, for attaching the clutch drum to the gear ring and cone, a metal cone holder 157 of tubular configuration is press-fitted over an oilless bearing 44a. This cone holder 157 preferably is an aluminum casting having an annular, radially outwardly extending flange 159 on the upper end thereof which integrally carries a series of circumferentially spaced, axially extending rivet projections 160. The disc portion 34 of the clutch drum 30 has a series of apertures which fit over these projections 160, the latter being coined or swaged for securing disc 34 to flange 159. By this means, drum 30 is rigidly secured to the cone holder 157 in coaxial relation therewith.

The gear or gear ring 36a is preferably fabricated of nylon and is also provided with a series of circumferentially spaced apertures into which are fitted rivet projections 160. These projections 160 are coined or swaged for securing the gear 36a to the cone holder 157.

The cone 38a is coaxially fitted over the cone holder 157 and is secured thereto by means of suitable set screws 162. The sleeve bearing 44a extends between the shoe assembly 28 of the centrifugal clutch and the thrust washer 42, a washer 42a of a suitable anti-friction material, such as Teflon or nylon, being interposed between the washer 42 and the end of the bearing 44a.

The spindle 52a is substantially identical to the spindle 52 of FIG. 6 with the exception that it is received by a suitable elongated bore 62 in a shaft support 164 which is integrally cast onto the gear housing 46. A threaded shank 56 attached to the handle 58 is threaded into the end of the spindle 52a for securing the latter in position. A washer 166 fits between the top 22 of the main housing and the handle 58 for assisting in the clamping of the spindle 52a in position.

A ball bearing assembly which includes two circles of ball bearings 168 and a suitable race 170 is press-fitted into the cone holder 157a which is constructed identically to cone holder 157. The gear ring 66a is riveted to the cone holder 157a the same as the ring 36a is to its holder 157, and the cone 68a is telescoped over and secured to the holder 157a by means of suitable set screws 162a. A press fit between the race 170 and the cylindrical interior of the holder 157a is sufficient to secure the cone 68a assembly in proper vertical position.

Two felt sealing washers 172 are interposed between the two cones 38a and 68a, respectively, and the housing cover plate 78 as shown.

The cones 38a and 68a are constructed identically and are shown in further detail in FIGS. 11 and 12. Each of these cones is provided with a series of axially extending, straight ribs 174 having outer edges or surfaces which lie in or define a frusto-conical surface corresponding to the surfaces of the cones 38 and 68. The outer edges of these ribs 174, in cross-section, are curved as shown more clearly in FIG. 12.

These ribs 174 at the base of the cone are flared radially outwardly as indicated by the numeral 176 to provide cooling fins or fan blades which resemble blades in a centrifugal air pump. These blades 176 are of a diameter which just clear each other when the two cones 38a and 68a are mounted in position as shown in FIG. 10.

Referring once again to FIG. 10, it should be noted that the gear housing 46 is abutted directly against the top 22 of the main housing 20, it not being necessary to use a buffer plate, such as buffer plate 50 in FIG. 6.

Operation of the embodiment of FIGS. 10, 11 and 12 is substantially the same as that of the arrangement of the preceding figures. As the motor shaft 26 increases in speed, the clutch 27 is actuated, causing the same rotation to be imparted to the gear ring 36a and cone 38a. The cone holder 157 is made sufficiently massive that the heat of friction developed in the clutch 27 can be substantially absorbed by the metal of the holder 157. This holder 157 may therefore be considered as a heat sink. Additionally, the cones 38a and 68a are made of metal, preferably cast aluminum, such that they, too, especially cone 38a, serve as heat sinks for draining heat from the holder 157. This results in keeping the temperature of the clutch 27 to a minimum, thereby protecting the nylon gear rings 36a and 66a from excessive heat. This protection applies more particularly to the gear ring 36a, since it is directly associated with the clutch 27.

Rotation of the gear ring 36a and cone 38a results in corresponding rotation of the gear ring 66a and the cone 68a. The cone holder 157a being mounted on the ball bearing assembly 168, 170, is rotatable about the spindle 52a.

The ribs 174 of the two cones 38a and 68a engage the sides of the tire the same as already explained in connection with FIG. 6. Any heat of friction developed in the cones 38a and 68a is rapidly dissipated by reason of the blades 176 which produce a cooling effect during rotation. Heating of the cones 38a and 68a is inhibited by the ribbed 174 design which reduces slippage and heat generation at the point of engagement with the tire. The upper fan or blade portion 176 of the cones dissipates heat from the engine shaft, the clutch and the driving cones themselves.

In order to adjust the spindle 52a in the slot 62, it is only necessary to loosen slightly the shank 56 by turning the handle 58. After the adjustment has been completed, handle 58 is turned in a direction to tighten stud 56 into the spindle 52a. This secures the latter in position against the top 22 of the housing 20.

Another embodiment or design of the driving cones is illustrated in FIGS. 13 and 14. This particular design is made to be interchangeable with the cones 38a, 68a in the assembly shown in FIG. 10. The numerals 38c and 68c serve to represent the substitute parts for the two cones 38a and 68a, respectively. Since the two cones 38c and 68c are identical in design, a description of one will suffice for both.

The cone of FIG. 13 is of stepped diameter construction, the smaller diameter section being indicated by the numeral 178 and the larger diameter section by the numeral 180. At the base of the larger diameter section 180 is a still larger diameter portion indicated by the numeral 182 having a series of radially extending grooves 184 arranged around the end surface thereof. These grooves 184 separate radially extending blades or cooling fins 186 which serve the same purpose as the fins 176 of FIG. 11.

The cone portion 180, where it joins with the end portion 182, is radiused at 188, as shown. Within or adjacent to this radiused portion is provided a threaded bore 190 for receiving a set screw. Another radiused shoulder 192 joins the two cone sections 178 and 180, as shown. A stepped diameter bore 194 coaxially of the cone is sized to fit snugly the cone holders 157 and 157a of FIG. 10 the same as the two cones 38a and 68a. A set screw received by the threaded bore 190 secures the cone to the respective cone holder.

Both of the cone sections 178 and 180, in one embodiment, are provided with the same tapers; however, as is explained in detail hereinafter, these tapers may differ slightly for providing maximum operating efficiency.

As explained earlier in connection with the preceding disclosed embodiments of this invention, different tire sizes may be accommodated by adjustment of the cones 68, 68a in the slot 62 (see FIG. 5). The cone design of FIGS. 13 and 14, however, provides an additional method of accommodating different tire sizes in a manner which leads to maximum operating efficiency.

Proper adjustment of the mechanism using the cones 38c, 68c may be explained by considering first that the cone sections 178 of the two cones 38c and 68c are properly engaged with a tire of given size. If a smaller tire is substituted, the entire driving unit must be adjusted lower by taking advantage of the slots 128 (FIG. 4) provided in the struts 116. By so lowering the unit, the cone sections 180 may be properly engaged with the tire. Further adjustment may be accomplished, of course, as previously explained, by swinging the cone 68c within the arc of adjustment provided by the slot 62 (FIG. 5).

Efficient driving engagement with minimum tire wear is accomplished when the two cones 38c and 68c are opposite each other with the axes thereof defining a plane which includes the axis of the rear wheel. By providing the two different diameter sections 178 and 180 on the driving cones, it is thus seen that at least two different tire sizes may be accommodated while maintaining the two cones in this position.

As explained earlier, the angle of taper on the cones may vary without departing from the spirit and scope of this invention. For maximum driving efficiency, however, it has been found that by making this taper such that the imaginary apex thereof coincides with the axis or center of the wheel, maximum driving efficiency with minimum tire wear is achieved. Thus, in a particular arrangement for a so-called 26-inch bicycle, the taper for the cones 38c, 68c approximates 4°, this angle being measured between the cone axis and a straight line on the surface of the cone which passes through the apex. From this it will be understood that the tapers of the two cone sections 178 and 180 will be slightly different when the imaginary, extended apex portions thereof coincide with the wheel center.

As was true in connection with the embodiments shown in FIGS. 10, 11 and 12, rotation of the cones 38c, 68c provides for some cooling by reason of the centrifugal pumping of air through the fin slots 184.

The cones 38, 38a, 38c and 68, 68a, 68c may be either larger or smaller in relation to the tire 80 than that shown in the figures, or of different taper, without departing from the spirit and scope of this invention. It may be said, however, that the larger the diameter of the cones, the greater will be the frictional contact with the tire 80. This, in some instances, may be desirable for the purpose of imparting more driving force with less slippage to the tire 80.

As shown in FIGS. 1 and 5, nameplates 158 may be secured to the opposite sides 24a and 24b of the chassis 20 for not only covering over the slot 92 assembly but to provide a convenient place for identifying the power unit.

Several advantages are realized by the use of the cones. The slanting engagement of the cones with the side portions of the tire tend to absorb any eccentricity in the tire or wheel. Further, this engagement provides a more constant grip on the tire during bouncing of the latter due to rough road conditions.

Drive cone wear on the tire is minimal, there being none on the tire periphery. Operation during wet conditions is more positive, inasmuch as the sides of the tire are drier than the tread because of the centrifugal forces which tend to keep the sides free and less wet than the tread.

Additionally, only minimum force of the driving cones with the tire sides is required because of the available greater surface contact with the tire. This results in less friction loss in power transmission and greater tire life.

The power unit 16, which includes the engine, is self-centering with the tire, resulting in much simpler mounting and attachment to a bicycle than has been possible heretofore.

The driving cones preferably are made of aluminum with the gears of nylon. However, it will appear as obvious to persons skilled in the art that other materials may be used without departing from the spirit and scope of this invention.

Ordinarily, if the power unit 16 is to be mounted on a conventional bicycle, the only constructional change required in the bicycle is the removal of a small section of the rear fender large enough to accommodate the two cones 38, 38a and 68, 68a.

While the adjusement of cones 68, 68a has been indicated as being locally controlled via the lever 58, this may, of course, be controlled remotely from a suitable handle mechanism mounted at a convenient location on the bicycle frame. Such a remote control would enable a rider to adjust the drive ratio as may be required by immediate riding needs.

Dimensions for a typical operating embodiment of this invention are given in the following by way of example only and not limitation:

Tire 80/size—26 x 2.125.
Cones, 38, 38a, 68, 68a length—1.5 inches.
Outer cones, 38, 38a, 68, 68a
Diameter at driving surface, tip—1.750 inches.
Cone taper—25° with respect to axis.
Maximum separation between axes of cones 38, 38a, 68, 68a—3.25 inches.
Speed range of motor 18 in r.p.m.—0 to 4500.

While there have been described above the principles of this invention in connection with specific apparatus, it is to be clearly understood that this description is made only by way of example and not as a limitation to the scope of the invention.

What is claimed is:

1. In combination with a vehicle having supporting framework and a tire-equipped driving wheel; a power unit comprising a frame attached to said framework, a motor mounted on said frame, two drive cones mounted in straddling relation of the tire on said wheel, means operatively mounting said cones on said frame for rotation about spaced apart axes, respectively, means for positioning said cones in frictional engagement with opposite side portions, respectively, of said tire, and means connecting said motor to said cones for imparting opposite rotation thereto whereby said wheel is correspondingly rotated.

2. The combination of claim 1 including means for adjusting the separation between said cones such that the spacing between said parallel planes is altered whereby different peripheral portions of said cones may be engaged with said tire.

3. The combination of claim 1 wherein said connecting means includes two meshed spur gears coaxially secured to said two cones, respectively, one of said gears having a driving connection with said motor.

4. The combination of claim 1 including means for adjusting the separation between said cones in a direction parallel to the axis of said wheel whereby different peripheral portions of said cones may be engaged with said tire, said connecting means including two meshed spur gears coaxially secured to said two cones, respectively, one of said gears having a driving connection with said motor, and means for selectively engaging and disengaging said cones with said tire.

5. The combination of claim 1 including means for adjustably swinging one of said cones in an arc having the axis of the other cone as a center, said arc defining a plane normal to said other cone axis, whereby different peripheral portions of said cones may be engaged with said tire.

6. The combination of claim 1 wherein said connecting means includes a clutch interposed between said cones and said motor whereby rotation may be selectively imparted to said cones by operation of said motor.

7. The combination of claim 1 wherein said connecting means includes two meshed spur gears coaxially secured to said two cones, respectively, one of said gears having a driving connection with said motor, means for adjustably swinging one of said cones in an arc having the axis of the other cone as a center while maintaining said two spur gears in mesh, said arc defining a plane normal to said other cone axis, whereby different peripheral portions of said cones may be engaged with said tire.

8. The combination of claim 1 wherein said cones have stepped diameter frusto-conical shaped sections arranged in end-to-end coaxial relation, the imaginary apex portions of said sections coinciding with the axis of said wheel, said sections being of progressively smaller diameter extending in a direction from one end of said member to the other, and means for positioning selected ones of said cone sections in engagement with said tire whereby different sized tires may be accommodated by said two drive cones.

9. In combination with a vehicle, a friction drive for engagement with a tire on the wheel of the vehicle comprising a frame, two frusto-conically shaped drive members mounted on said frame for rotation about the axes thereof, said axes being substantially parallel and said members being spaced apart a predetermined distance, and means for imparting simultaneous opposite rotation to said members.

10. The friction drive of claim 9 wherein at least one of said drive members has opposite ends and stepped diameter frusto-conically shaped sections disposed in coaxial end-to-end relation, the angles of the external surfaces of said sections converging in a common direction, said sections being of progressively smaller diameter extending in a direction from one end of said member to the other.

11. For use in combination with a bicycle having a tire-equipped rear wheel and a frame, a powered friction drive comprising a chassis having a motor mounted thereon, said motor having a shaft projecting through said chassis, a first spur gear operatively connected to said shaft for rotation therewith, a first frusto-conically shaped drive member coaxially secured to said spur gear for rotation therewith, a spindle mounted on said chassis in spaced apart parallel relation with respect to said motor shaft, means for adjustably swinging said spindle in an arc about the axis of said motor shaft as a center, a second spur gear rotatably mounted on said spindle and meshed with said first spur gear, a second frusto-conically shaped drive member coaxially secured to said second gear for rotation therewith, and the axes of said first and second gears being substantially parallel and said first and second drive members being juxtaposed and spaced apart a predetermined distance in a direction transverse to the axes thereof.

12. The apparatus of claim 11 wherein said adjusting means for said spindle includes an arcuate slot in said chassis having a curvature concentric about the axis of said motor shaft, a threaded member extending through said slot and being coaxially threaded into said spindle for securing the latter to said chassis.

13. The apparatus of claim 11 including a mounting arm device having opposite ends, one end of said arm device having a U-shaped clamp pivotally connected thereto, the other end of said arm device being connected to said chassis, said other end being longitudinally slotted and said chassis having slots transverse to said longitudinal slot when said arm device is connected thereto, fastening screws passing through the slots of said arm device and said chassis for adjustably securing the latter together; and the pivotal connection between said U-shaped clamp and said arm device including a spindle passing through the latter and rubber cushion elements on said spindle interposed operatively between said U-shaped clamp and said arm device.

14. The apparatus of claim 11 including two mounting braces for attaching said chassis to the bicycle frame, said braces being operatively attached to opposite lateral portions respectively of said chassis, each brace comprising two tubular members slidably telescoped together and having a stop thereon which limits the extent to which they may be telescoped, a tension spring inside said tubular members connected at the opposite ends thereof to said two tubular members, respectively, said tension spring yieldably telescoping said two members together, a shaft eccentrically rotatably mounted on said chassis and extending laterally across the latter, one end of each brace being pivotally connected to said eccentric shaft whereby rotation of the latter will result in corresponding longitudinal movement of said braces.

15. The apparatus of claim 11 including a mounting arm device having opposite ends, one end of said arm device having a U-shaped clamp pivotally connected thereto, the other end of said arm device being connected to said chassis, said other end being longitudinally slotted and said chassis having slots transverse to said longitudinal slot when said arm device is connected thereto, fastening screws passing through the slots of said arm device and said chassis for adjustably securing the latter together; and the pivotal connection between said U-shaped clamp and said arm device including a spindle passing through the latter and rubber cushion elements on said spindle interposed operatively between said U-shaped clamp and said arm device; two mounting braces for attaching said chassis to the bicycle frame, said braces being operatively attached to opposite lateral portions respectively of said chassis, each brace comprising two tubular members slidably telescoped together and having a stop thereon which limits the extent to which they may be telescoped, a tension spring inside said tubular members connected at the opposite ends thereof to said two tubular members, respectively, said tension spring yieldably telescoping said two members together, a shaft eccentrically rotatably mounted on said chassis and extending laterally across the latter, one end of each brace being pivotally connected to said eccentric shaft whereby rotation of the latter will result in corresponding longitudinal movement of said braces.

16. The apparatus of claim 11 wherein at least one of said drive members is provided with a ribbed surface which includes a multiplicity of circumferentially spaced axially extending ribs having valley portions therebetween.

17. The apparatus of claim 11 wherein at least one of said drive members is provided with a ribbed surface which includes a multiplicity of circumferentially spaced axially extending ribs having valley portions therebetween, one of said drive members at the base thereof having a plurality of circumferentially spaced cooling fins which radially project outwardly therefrom.

18. The apparatus of claim 11 and including a sleeve-like cone holder of metal, said holder being mounted on said shaft, said first drive member being mounted on said cone holder, an annular flange on said holder, said first spur gear being of annular configuration and being coaxially attached to said flange, said flange having rivet members which are secured to said first gear for attaching the latter to said flange.

19. In combination, a bicycle having a tire-equipped rear wheel and a frame, a friction drive operatively engageable with the tire of said wheel; said friction drive comprising a carrier, two frusto-conically shaped drive members mounted on said carrier for rotation about the axes thereof, said axes being substantially parallel and said members being engageable with opposite side portions, respectively, of said tire, means for imparting opposite rotation to said members, such opposite rotation being in a direction as to rotate said rear wheel forwardly, the axes of said members being substantially upright and being located in a range extending from a vertical line passing through the axis of said rear wheel and to points both forwardly and rearwardly thereof.

20. The combination of claim 19 including means for altering the spacing between said drive members as measured in a direction parallel to the axis of said rear wheel.

References Cited
UNITED STATES PATENTS

| | | | |
|---|---|---|---|
| 1,615,432 | 1/1927 | Allen | 74—198 |
| 2,409,887 | 10/1946 | Murphy | 180—74 X |
| 2,586,082 | 2/1952 | Piatti | 180—33 |
| 3,178,953 | 4/1965 | Talbot | 74—194 X |
| 3,282,364 | 11/1966 | Cramp | 180—74 X |

FOREIGN PATENTS

| | | |
|---|---|---|
| 1,153,033 | 9/1957 | France. |
| 804,069 | 4/1951 | Germany. |

KENNETH H. BETTS, *Primary Examiner.*